UREA COMPOUNDS WITH SELECTIVE HERBICIDAL ACTIVITY

Dieter Durr, Bottmingen, Switzerland, assignor to Ciba-Geigy AG, Basel, Switzerland
No Drawing. Continuation-in-part of application Ser. No. 879,617, Nov. 24, 1969, which is a continuation-in-part of application Ser. No. 745,108, July 16, 1968, both now abandoned. This application Aug. 16, 1971, Ser. No. 172,264
Claims priority, application Switzerland, July 21, 1967, 10,422/67
Int. Cl. C07c *125/06*
U.S. Cl. 260—453 R    6 Claims

ABSTRACT OF THE DISCLOSURE

Ureas of the formula

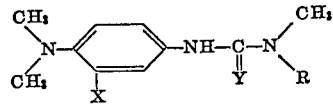

their acid addition salts and use in herbicidal preparations are disclosed. In the above formula R represents a hydrogen atom or a lower alkyl radical, or a lower alkoxy radical, Y represents an oxygen or sulfur atom and X is a chlorine or bromine atom or the trifluoromethyl radical. They are especially suited to control the growth and proliferation of weeds in crops of cereals.

CROSS REFERENCE

This application is a continuation-in-part of my application Ser. No. 879,617, filed Nov. 24, 1969 which itself is a continuation-in-part of my application Ser. No. 745,108 filed July 16, 1968 both now abandoned.

DESCRIPTION OF THE INVENTION

The present invention provides pesticidal preparations, especially preparations for inhibiting the growth and proliferation of undesired plants, such as wild grasses and weeds, in culture crops such as cereals which comprise as the active ingredient one or more compounds of the general formula

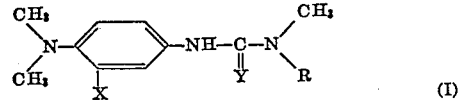

wherein R represents a hydrogen atom, a lower alkyl or a lower alkoxy radical, Y represents an oxygen or sulphur atom and X represents a chlorine or bromine atom or the trifluoromethyl group, and acid addition salts thereof with an inorganic or organic acid, together with a carrier. The preparations may also contain one or more of the following additives: a solvent, a dispersing agent, a wetting agent, an adhesive, a binder, a thickner and/or fertilizer and/or optionally other known pesticides, especially materials for combating undesired plant growth.

As acids which may be used for salt formation for the active ingredients of Formula I there may be mentioned for example the following inorganic acids: sulphuric acid, hydrochloric acid, hydrobromic acid, sulphamic acid and nitric acid; and organic acids: acetic acid, trichloracetic acid, fumaric acid, maleic acid, benzoic acid, trichlorobenzoic acid, trichloraminopicolinic acid, dichloromethoxybenzoic acid, phthalic acid, tetrachlorophthalic acid and nicotinic acid.

Lower alkyl means that the carbon chain contains 1 to 4 carbon atoms and may be straight or branched. Examples of such lower alkyl radicals are methyl, ethyl, propyl, isopropyl, n-butyl, isobutyl, sec. or tert. butyl. Preferred, however, are straight chained radicals containing 1 or 2 carbon atoms.

The statement made for lower alkyl is also valid for lower alkoxy.

Preferred compounds correspond to the formula

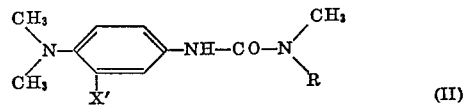

wherein R has the meanings given in Formula I, and X' stands for chlorine or bromine.

The ureas of the Formula I and their acid addition salts with an organic or inorganic acid are new and thus constitute part of this invention.

The preparations which contain an active ingredient of Formula I may, depending on the amount used, be employed as total herbicides or as selective herbicides in culture plants, for combating wild grasses and/or weeds.

By weeds there may be also understood undesired culture plants, that is to say plants which have previously been cultivated. The compounds defined above are furthermore also suitable for use as active substances for exerting other inhibiting influences on plant growth, especially defoliation, for example, of cotton plants, acceleration of ripening by premature drying-out, for example of potato plants, and also for the reduction of fruit setting, retardation of flowering or prolongation of the storability of the harvest products. Furthermore, the use of growth-inhibiting agents can under certain circumstances not only lead to an increase in yield as a result of suppressing the weeds but also a result of the fact that these agents counteract influences which can stimulate the growth of the culture plants in an undesired direction, for example, high temperatures or excessive use of fertilizer. Employed in small quantities which do not permit any phytotoxic side-effects to arise, the new preparations can also be used for combating phytopathogenic bacteria and fungi.

In certain dilutions, the new preparations can also be worked into the soil, or the soil may be impregnated with them; this type of treatment serves to combat plant-parasitary nematodes.

Many of the active substances defined by Formula I also possess a strong action against gastropodes, waterpests, as well as algae, sedentaria, slime baceteria and water-weeds.

The preparations of the invention, for influencing plant growth and combating weeds can be used in the form of solutions, emulsions, suspensions, granules or dusting agents. The form used entirely depends on the end to be achieved. At the same time all forms of use must ensure that the active substance can be finely distributed. The action can, especially in total suppression of plant growth, in premature drying-out and in defoliation, be reinforced by the use of carriers which are in themselves phytotoxic, for example, high-boiling mineral oil fractions or chlorinated hydrocarbons; on the other hand the selecivity of growth inhibition generally clearly manifests itself when using carriers which are inert towards plants, for example, in selective combating of weeds.

Suitable materials for the manufacture of solutions are solvents, for example, especially alcohols, for example, ethyl or isopropyl alcohol, ketones, for example, acetone or cyclohexanone, aliphatic hydrocarbons, for example, kerosene and cyclic hydrocarbons for example, benzene, toluene, xylene, tetrahydronaphthalene, alkylated naphthalenes and also chlorinated hydrocarbons, for example, tetrachlorethane or ethylene chloride, and finally also mineral and vegetable oils or mixtures of the abovementioned substances.

The aqueous preparations are preferably in the form of emulsions and dispersions. The substances, either per se or in one of the abovementioned solvents, may be homogenized in water, preferably by means of a wetting agent or a dispersing agent. Quaternary ammonium compounds may be mentioned as examples of cationic emulsifiers or dispersing agents, soap, soft soap, aliphatic long-chain sulphuric acid monoesters, alkylphenylsulphonic acids, long-chain alkoxyacetic acids as anionic agents and polyethylene oxide condensation products of higher fatty acids, higher alcohols and higher amines as non-ionic agents. On the other hand, it is also possible to manufacture concentrates, suitable for dilution with water before use, comprising the active substance, emulsifier or dispersing agent and optionally a solvent. Dusting agents can initially be manufactured by mixing or joint grinding of the active substance with a solid carrier. Suitable carriers are: talc, diatomaceous earth, kaolin, bentonite, calcium carbonate, boric acid, tricalcium phosphate, but also wood flour, cork powder, charcoal and other materials of vegetable origin. On the other hand the substances can also be applied to the carriers by means of a volatile solvent. Powder-form preparations and pastes can be rendered capable of suspension in water and used as spraying agents by adding wetting agents and protective colloids.

Since the active substances according to the invention include both solid and also liquid substances having substantially the same herbicidal activity, it is easily possible to manufacture both liquid concentrates for aqueous emulsions and also powder-form or paste-form concentrates for aqueous suspensions, having a high concentration of active substance.

The various forms which may be used may in the usual manner be more closely suited to the end to be achieved by adding substances which improve the distribution, the adhesion, the rain resistance and optionally the penetrating power, for example, fatty acids, resins, wetting agents, glue, casein or alginates. Equally, their biological action can be broadened by adding substances having bactericidal or fungicidal properties or properties which also influence plant growth, as well as fertilizers.

The active substances of Formula I can be easily manufactured as follows:

A reactive derivative of carbonic acid or thiocarbonic acid is reacted, in optional sequence, with a dimethyl aniline of formula

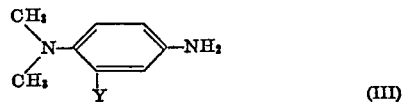

(III)

wherein Y has the meanings hereinbefore defined, and a methyl amine of formula

(IV)

wherein R has the meanings hereinbefore defined.

According to the process, a possible procedure is, for example, to react an aniline of Formula III with phosgene or thiophosgene and allowing the resulting carbanilic acid chloride or the corresponding iso(thio)cyanate to react further with an amine of Formula IV. Conversely it is also possible first to allow an amine of Formula IV to react with phosgene or thiophosgene and then to react the resulting carbamic acid chloride (or, if R is hydrogen, the resulting iso(thio)cyanate) further with an aniline of Formula III. Instead of phosgene or thiophosgene it is also possible to react a halogenocarbonic acid ester, preferably an aryl ester, with an aniline of Formula III or with an amine of Formula IV and to amidize the resulting urethane with a corresponding amine or aniline. It is also possible to react an aniline of Formula III with a reagent which yields isocyanic acid, for example, an alkali isocyanate in acid solution or nitrourea, and to transamidize the resulting urea with an amine of Formula IV.

The methods of manufacture for arylureas to which the ureas of the type of Formula I belong are part of the state of the art so that descriptions of details of the procedure and method, for example, are superfluous.

EXAMPLE 1

(a) 38.4 g. of 1,2-dichloro-4-nitrobenzene in 200 ml. of alcohol are heated with 52 ml. of 40% strength dimethylamine for 5 hours to 150° C. The mixture is allowed to cool and the resulting 3-chloro-4-dimethylaminonitrobenzene is precipitated by adding water. 39.5 g., melting point 79–80° C.

(b) 588 g. of 3-chloro-4-dimethylaminonitrobenzene in 1.4 l. of dimethylformamide and 20 g. of Raney nickel are hydrogenated with hydrogen. After completion of the reaction the catalyst is filtered off, the solution is evaporated and the residue is distilled in vacuo. Yield 456 g.; boiling point 115° C./0.8 mm. Hg.

(c) 170.5 g. of 3-chloro-4-dimethylaminoaniline in 500 ml. of acetonitrile are stirred for 2 days with 85 g. of pyridine and 120 g. of dimethylcarbamoyl chloride. The product is precipitated by adding water and 160 g. of N',N'-dimethyl-N - (3 - chloro - 4-dimethylaminophenyl) urea are obtained. Melting point 127° C. [Compound No. 1.]

The following compounds are manufactured in a similar manner.

| Compound number | Formula | Melting point, °C. |
|---|---|---|
| 2 | $(CH_3)_2N$–C₆H₃(Br)–NH–CO–N(CH_3)_2 | 135–136 |
| 3 | $(CH_3)_2N$–C₆H₃(CF_3)–NH–CO–N(CH_3)_2 | 141–142 |
| 4 | $(CH_3)_2N$–C₆H₃(Cl)–NH–CS–N(CH_3)_2 | 137–138 |
| 5 | $(CH_3)_2N$–C₆H₃(Cl)–NH–CO–N(CH_3)(OCH_3) | 72–73 |
| 6 | $(CH_3)_2N$–C₆H₃(Cl)–NH–CO–NH–CH_3 | 153–154 |
| 7 | $(CH_3)_2N$–C₆H₃(Br)–NH–CO–NH–CH_3 | 156–157 |
| 8 | $(CH_3)_2N$–C₆H₃(Cl)–NH–CS–NH–CH_3 | 153–155 |

EXAMPLE 2

40 parts of the active substance No 1 and 400 parts of talc are ground in a ball mill to maximum fineness. The resulting mixture serves as a dusting agent.

EXAMPLE 3

20 parts of the active substance No. 3 are dissolved in a mixture of 100 parts of diacetone-alcohol, 16 parts of xylene and 20 parts of an anhydrous high molecular condensation product of ethylene oxide with a high molecular fatty acid. This concentrate can be diluted with water to give emulsions of any desired concentration.

EXAMPLE 4

50 parts of active substance No. 3 are mixed with 3–4 parts of a wetting agent, for example, a sulphuric acid ester of an alkylpolyglycol ether, about 2–3 parts of a protective colloid, for example, sulphite waste lye and 18–20 parts of an inert solid carrier, for example, kaolin, chalk, bentonite, and kieselguhr, and thereafter finely ground in a suitable mill. The resulting wettable powder may be stirred with water before use and thus yields stable suspensions.

EXAMPLE 5

50 g. of active substance No. 1 were very finely ground with 40 g. of kaolin, 5 g. of Zeosil (finely precipitated silica), 3.5 g. of a condensation product of 1 mol of p-tert. octylphenol with about 8 mols of ethylene oxide and 1.5 g. of sodium 2 - heptadecyl-3-benzyl-imidazoledisulphonate. A 50% strength spraying powder is obtained which was used for the biological experiments listed in Example 6.

EXAMPLE 6

The following test plants were sown in a greenhouse: Triticum, Hordeum, Arena, Zea, Oryza, Digitaria, Sorghum, Panicum, Poa, Alopecurus, *Cyperus veg.*, *Cynodon veg.*, Beta, Galicum, Calendula, Chrysanthemum, Linum, Brassica, Ipomoea, Daucus, Soja, Gossipium, Amaranthus and Stellaria.

12 days after sowing, when the plants had reached the 1–2 leaf stage, the test plants were sprayed with suspensions which contained the active substances.

The amounts used were 1, 2 and 2.5 and 3 kg./ha. of active substance/ha. The action was assessed 18 days after treatment and is present in the following table.

LEGEND

1: plant growth absolutely unaffected
2: isolated small scorch marks on leave tips
3: light to medium leave scorches or light chlorosis or medium growth retardation
4: strong leave scorches or strong chlorosis or growth retardation with chlorosis; growing point not affected
5: damages as under 4; growing point affected; recovery uncertain
6: combination of damages as listed under 2 to 5; further development of plant not possible; no recovery
7: damages more pronounced than under 6
8: and 9: plant drying

|  | Compound Nos. | | | | | |
|---|---|---|---|---|---|---|
|  | 1 | 2 | 3 | 4 | 5 | 6 |
| Concentration, kg./ha | 1 2 | 1 2 | 2 3 | 1 2.5 | 1 2 | 2 |
| Plant: | | | | | | |
| Triticum | 1 1 | 1 2 | 2 2 | 1 2 | 1 1 | 1 |
| Hordeum | 1 1 | 1 1 | 3 3 | 1 2 | 1 1 | 1 |
| Avena | 2 3 | 1 1 | 2 3 | 2 3 | 1 1 | 1 |
| Zea | 1 1 | 1 1 | 1 1 | 1 1 | 1 1 | 1 |
| Oryza | 3 4 | 2 3 | 3 4 | 1 3 | 1 2 | 1 |
| Digitaria | 3 4 | 6 9 | 7 9 | ---- | 1 5 | ---- |
| Sorghum | 1 1 | 2 3 | 2 3 | ---- | 1 1 | ---- |
| Panicum | 2 3 | 1 4 | 8 8 | ---- | 1 1 | ---- |
| Poa | 3 5 | 6 6 | 7 8 | 7 7 | 3 5 | ---- |
| Alopecurus | 2 4 | 4 6 | 4 4 | ---- | 3 5 | ---- |
| Cyperus | 2 3 | 1 1 | 1 3 | ---- | 1 1 | ---- |
| Cynodon | 1 3 | 1 1 | 1 1 | ---- | 1 1 | ---- |
| Beta | 7 9 | 7 9 | 6 9 | 9 8 | 4 9 | 6 |
| Galium | 9 9 | 9 8 | 6 4 | 9 ---- | 1 3 | ---- |
| Calendula | 6 9 | 9 6 | 6 9 | 9 8 | 4 9 | ---- |
| Chrysanthemum | 9 9 | 9 9 | 9 9 | 9 9 | 9 9 | 9 |
| Linum | 5 9 | 9 9 | 9 9 | 7 9 | 3 9 | ---- |
| Brassica | 7 9 | 9 9 | 9 9 | 9 9 | 9 9 | 7 |
| Ipomoea | 9 9 | 9 9 | 9 9 | 9 8 | 5 9 | ---- |
| Daucus | 6 9 | ---- | 6 9 | ---- | ---- | ---- |
| Soja | 4 9 | 3 7 | 3 3 | ---- | 1 3 | ---- |
| Gossipium | 9 9 | 7 7 | ---- | ---- | 3 5 | ---- |
| Amaranthus | ---- | 9 9 | ---- | 7 9 | 8 9 | 6 |
| Stellaria | ---- | 9 9 | ---- | 9 9 | 9 9 | 6 |

EXAMPLE 7

Test plants were sown into trays in a greenhouse. 12 days after sowing, when the plants had reached the 1 to 2 leaf stage, they were sprayed with solutions of the active substance to be tested corresponding to an amount of 1, 2, 4 or 5 kg. per ha. The effect on the plants was assessed 18 days after the treatment and the result is presented in the table below.

(A) N-(3-chloro-4-dimethylaminophenyl)-N',N'-dimethyl-urea, Compound No. 1
(B) N-(3-chloro-4-dimethylaminophenyl)-N'-methyl-urea, Compound No. 6
(C) N-(3-chloro-4-diethylaminophenyl)-N',N'-dimethyl-urea, Example VIII of the U.S. Pat. No. 3,484,484
(D) N-(3-chloro-4-diethylaminophenyl)-N'-methyl-urea according to the U.S. Pat. No. 3,484,484

The evaluation was made according to the following key:
1–3 _____ No effect on plants.
3–6 _____ Medium to heavy damage.
6–9 _____ Plant damaged beyond recovery.

|  | Compound | | | |
|---|---|---|---|---|
|  | A | B | C | D |
| Concentration, kg. AS/ha | 1 2 5 | 1 2 5 | 1 2 4 | 1 2 4 |
| Plant: | | | | |
| Triticum | 1 1 6 | 1 1 1 | 4 7 9 | 8 9 9 |
| Hordeum | 1 1 4 | 1 1 1 | 3 6 9 | 6 7 8 |
| Avena | 2 3 7 | 1 2 3 | 3 5 7 | 3 4 7 |
| Zea | 1 1 4 | 1 1 2 | 1 2 5 | 3 3 5 |
| Oryza | 3 4 7 | 1 2 3 | 5 6 8 | 6 7 8 |
| Digitaria | 3 4 6 | 1 5 9 | 1 9 9 | 9 9 9 |
| Sorghum | 1 1 9 | 1 1 3 | 2 2 7 | 4 6 9 |
| Poa | 3 5 8 | 3 5 7 | 4 5 5 | 9 9 9 |
| Alopecurus | 1 4 9 | 3 5 6 | 3 5 5 | 5 9 9 |
| Beta | 7 9 9 | 4 9 9 | 6 6 9 | 9 9 9 |
| Galium | 9 9 9 | 1 3 9 | ---- | ---- |
| Calendula | 6 9 9 | 4 9 9 | ---- | ---- |
| Chrysanthemum | 9 9 9 | 9 9 9 | 4 9 9 | 9 9 9 |
| Linum | 5 9 9 | 3 9 9 | 6 9 9 | 9 9 9 |
| Brassica | 7 9 9 | 9 9 9 | 7 9 9 | 9 9 9 |
| Ipomoea | 9 9 9 | 5 9 9 | 8 9 9 | 9 9 9 |
| Stellaria | ---- 9 9 | 9 7 9 | 9 9 9 | |
| Soja | 9 9 9 | 1 3 8 | 4 6 6 | 9 9 9 |

In the above test the Compounds A and B act as selective herbicides when used in a concentration of 2 kg./ha. in post-emergence application, inhibiting selectively the growth of weeds while leaving the crop, wheat, barley, oats, and rice virtually unharmed. In the same test the Compounds C and D according to the U.S. Pat. No. 3,484,484 act in post-emergence application of 2 kg./ha. as total herbicides, damaging wheat, barley, oats and rice as well as the weeds.

I claim:
1. A urea of the formula

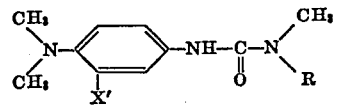

wherein R represents a hydrogen atom, a lower alkyl or a lower alkoxy radical and X' is a chlorine or bromine atom.

2. The urea according to claim 1 of the formula

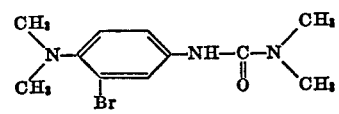

3. The urea according to claim 1 of the formula

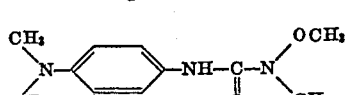

4. The urea according to claim 1 of the formula
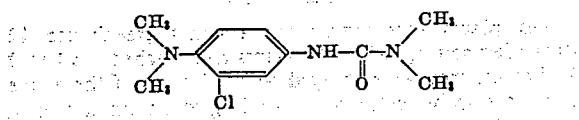
5. The urea according to claim 1 of the formula
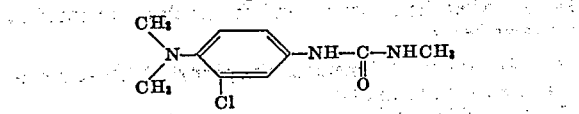
6. The urea of the formula
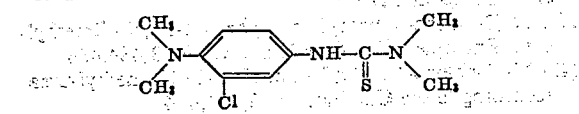
References Cited
UNITED STATES PATENTS
| | | | |
|---|---|---|---|
| 3,484,484 | 12/1969 | Schwartz | 260—553 A |
| 3,288,851 | 11/1966 | Martin et al. | 260—553 A |
| 3,177,249 | 4/1965 | Martin et al. | 260—553 A |
LEON ZITVER, Primary Examiner
M. W. GLYNN, Assistant Examiner
U.S. Cl. X.R.
260—553 A; 71—99, 120